Patented May 10, 1927.

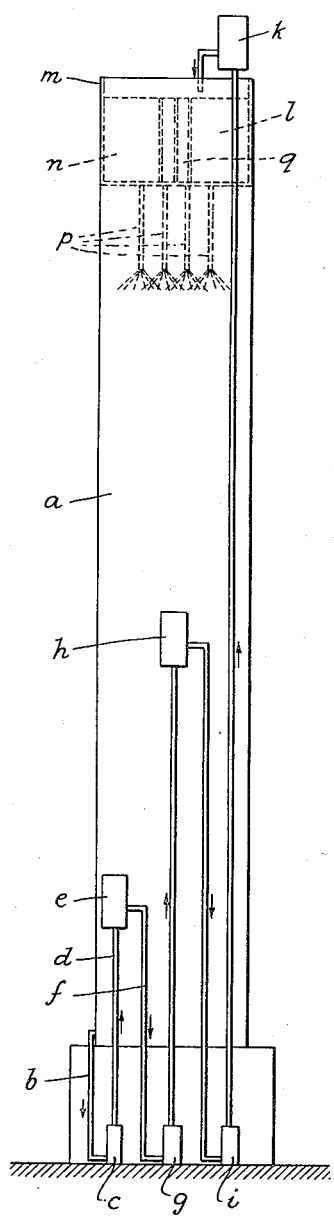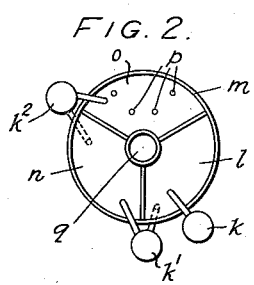

1,628,477

UNITED STATES PATENT OFFICE.

ERNEST WOODHOUSE SMITH AND THOMAS CAMPBELL FINLAYSON, OF LONDON, ENGLAND, ASSIGNORS OF ONE-THIRD TO WOODALL-DUCKHAM LIMITED, OF LONDON, ENGLAND.

REMOVAL OF SULPHURETED HYDROGEN FROM GAS AND APPARATUS THEREFOR.

Application filed November 14, 1925, Serial No. 69,108, and in Great Britain December 10, 1924.

This invention relates to processes of removing sulphureted hydrogen from gas which depend on the use of an absorbing liquor which requires regeneration by oxidation to render it fit for re-use.

An object of the invention is to save space and power in installations for purifying gases in which air is caused to bubble through the liquor for the purpose of regenerating it. Hitherto the liquor has been treated in aerating tanks, which occupied much ground space, and from these tanks the liquor was pumped to the top of the absorption towers in which it descended in counter current to the gas to be purified. By the present invention the aerating tanks are eliminated and the power absorbed in pumping is diminished.

Another object of the invention is to facilitate the oxidation of the spent liquor by conducting the aeration process under pressure.

These and other objects are achieved by bringing the air into intimate contact with a column of the spent liquor, the air being admitted at or near the foot of the column so as to form a column of emulsion of air and spent washing liquor. Such a column of emulsion covers a small ground space, and the air entering near the base of the column is under a comparatively high pressure and the regeneration process (in which the dissolved oxygen plays an important part), is favorably influenced. Furthermore, the purifying air serves to raise the liquor in the manner of an air-lift, thus economizing power.

One mode of carrying out the invention consists in causing the spent liquor from the gas-purification chamber to enter the foot of an air-lift of known type and in which an emulsion is formed between air and liquid. By this means a particularly effective intermixing of the air and the liquor is attained. Furthermore, the air for the regeneration serves to raise the liquor to the height necessary to permit it to flow after regeneration into the upper portion of the gas-purification chamber, thus rendering unnecesasry the use of separate pumps for this purpose.

The air-lift may be in one or more stages, according to the height of the column.

If the liquid is not sufficiently regenerated by elevation through one column it may be allowed to flow through another column.

The process may be rendered continuous by causing the spent liquor to pass continuously to the regenerating column, and returning the regenerated liquor continuously to the purification chamber.

The accompanying diagram will help to explain the invention. It represents an absorption tower in elevation in Fig. 1 and in plan in Fig. 2.

It is assumed that the washing liquor used is that commonly employed, namely a solution of an alkali (for instance, sodium carbonate) containing in suspension a compound of iron (for instance, ferric hydroxide). This liquor absorbs sulphureted hydrogen from the gas, forming iron sulphide, and during the subsequent regeneration by oxidation the iron sulphide again becomes iron oxide.

$a$ is the alkaline absorption tower. The liquor charged with sulphide flows from the bottom of the tower by pipe $b$ into the emulsifier $c$ of an air-lift where it is mixed with air in known manner, the emulsion rising up pipe $d$ into the separator $e$. Here the air leaves the liquor which now flows down pipe $f$ into the second emulsifier $g$. Having passed in like manner through a second separator $h$ and a third emulsifier $i$, the liquor finally arrives at the third separator $k$ at the top of the tower. From $k$ the liquor flows into compartment $l$ (Fig. 2) of the cylindrical tank $m$. From this compartment the liquor, if it should require further regeneration, is allowed to flow down a pipe into the emulsifier of an air-lift not here shown, but similar to $i$, and is raised therefrom into a separator $k'$, at the top of the tower, and so to compartment $n$. This course may be repeated with yet another emulsifier and separator $k^2$, until the liquor finally arrives in compartment $o$, whence it flows into the distributors $p$ of the absorption tower.

The sulphur produced by the regeneration of the liquor rises to the surface in the form of a frothy scum in each of the aforesaid compartments, and flows over into the axial pipe $q$. The pipe $q$ is connected with a discharge, not shown, which delivers the sulphur and liquor accompanying it, into a centrifuge at ground level.

Having thus described the nature of the said invention and the best means we know of carrying the same into practical effect, we claim:—

1. A process of regenerating spent liquor of the kind herein referred to, which consists in introducing air into the lower part of an upwardly moving column of the liquor so as to form an upwardly moving column of air and liquor.

2. A process of regenerating spent liquor of the kind herein referred to, which consists in feeding the liquor to the lower part of a hollow column, injecting air into the liquor at the said part so as to cause a mixture of air and liquor to ascend the column and causing the mixture to discharge from the upper part of the column.

3. A process of regenerating spent liquor of the kind herein referred to, which consists in feeding the liquor to the lower part of a hollow column, injecting air into the liquor at the said part so as to cause a mixture of air and liquor to ascend the column, causing the mixture to discharge from the upper part of the column into a vessel in which the air separates from the mixture, then causing the liquor to descend from the vessel to the lower part of a second hollow column and injecting air into the lower part of this column to repeat the operation.

4. The combination of an absorption tower for removing sulphureted hydrogen from gas by means of a washing liquor of the kind herein referred to, a tank at the top of the tower for discharging liquor into the tower, a hollow column adapted to deliver liquor from its upper part into the tank, means for feeding liquor into the lower part of the column and means for injecting air into the liquor at the said lower part.

5. The combination of an absorption tower for removing sulphureted hydrogen from gas by means of a washing liquor of the kind herein referred to, a tank at the top of the tower for discharging liquor into the tower, a hollow column adapted to deliver liquor from its upper part into the tank, means for feeding liquor into the lower part of the column, means for injecting air into the liquor at the said lower part, and means for discharging from the said tank matter floating on the surface of the liquor therein.

6. The combination of an absorption tower for removing sulphureted hydrogen from gas by means of a washing liquor of the kind herein referred to, a tank at the top of the tower for discharging liquor into the tower, an air-lift discharging into the tank, means for feeding liquor to the air-lift and a pipe for flow of liquor from the tower to the air-lift.

7. The combination of an absorption tower for removing sulphureted hydrogen from gas by means of a washing liquor of the kind herein referred to, a tank at the top of the tower for discharging liquor into the tower, an air-lift discharging into the tank, means for feeding liquor to the air-lift, a pipe for flow of liquor from the tower to the air-lift, and means for discharging from the said tank matter floating on the surface of the liquor therein.

8. The combination of an absorption tower for removing sulphureted hydrogen from gas by means of a washing liquor of the kind herein referred to, a device for distributing liquor in the tower at the top thereof, a number of tanks at the top of the tower, an air-lift discharging into the first of the said tanks, means for feeding liquor to the air-lift, a second air-lift discharging into the second of the said tanks, means for feeding to the second air-lift liquor which has been discharged into the first of the said tanks, the liquor continuing to flow from one tank to another through an air-lift, and means for flow of liquor from the final tank to the said device for distributing liquor.

9. The combination of an absorption tower for removing sulphureted hydrogen from gas by means of a washing liquor of the kind herein referred to, a device for distributing liquor in the tower at the top thereof, a number of tanks at the top of the tower, an air-lift discharging into the first of the said tanks, means for feeding liquor to the air-lift, a second air-lift discharging into the second of the said tanks, means for feeding to the second air-lift liquor which has been discharged into the first of the said tanks, the liquor continuing to flow from one tank to another through an air-lift, means for flow of liquor from the final tank to the said device for distributing liquor and means for discharging from each tank matter floating on the surface of the liquor therein.

In testimony whereof we have signed our names to this specification.

ERNEST WOODHOUSE SMITH.
THOMAS CAMPBELL FINLAYSON.